(12) United States Patent
Saitou

(10) Patent No.: US 9,298,248 B2
(45) Date of Patent: Mar. 29, 2016

(54) SEMICONDUCTOR DEVICE AND ELECTRICAL TERMINAL

(71) Applicant: LAPIS SEMICONDUCTOR CO., LTD., Kanagawa (JP)

(72) Inventor: Takayuki Saitou, Kanagawa (JP)

(73) Assignee: LAPIS SEMICONDUCTOR CO., LTD., Kanagawa (JP)

( * ) Notice: Subject to any disclaimer, the term of this patent is extended or adjusted under 35 U.S.C. 154(b) by 0 days.

(21) Appl. No.: 13/859,169

(22) Filed: Apr. 9, 2013

(65) Prior Publication Data
US 2013/0268792 A1    Oct. 10, 2013

(30) Foreign Application Priority Data

Apr. 10, 2012 (JP) ................. 2012-089352

(51) Int. Cl.
  G06F 3/00       (2006.01)
  G06F 15/16      (2006.01)
  G06F 1/32       (2006.01)
(52) U.S. Cl.
  CPC ............ G06F 1/3234 (2013.01); G06F 1/3206 (2013.01)
(58) Field of Classification Search
  None
  See application file for complete search history.

(56) References Cited

U.S. PATENT DOCUMENTS

| | | | |
|---|---|---|---|
| 2003/0136191 A1* | 7/2003 | Tsuji | 73/384 |
| 2008/0064446 A1* | 3/2008 | Camp et al. | 455/565 |
| 2010/0242599 A1* | 9/2010 | Ogawa et al. | 73/488 |
| 2011/0231144 A1* | 9/2011 | Kitamura et al. | 702/141 |
| 2011/0300875 A1* | 12/2011 | Kim et al. | 455/456.1 |
| 2011/0307210 A1* | 12/2011 | Stevens et al. | 702/150 |
| 2012/0327922 A1* | 12/2012 | Takahashi et al. | 370/338 |
| 2013/0110354 A1* | 5/2013 | Kiribayashi | 701/45 |
| 2013/0179107 A1* | 7/2013 | Setoguchi | H04M 1/72569 702/94 |
| 2013/0310075 A1* | 11/2013 | Lim | H04W 4/025 455/456.2 |

FOREIGN PATENT DOCUMENTS

| | | |
|---|---|---|
| JP | 2011-030643 A | 2/2011 |
| JP | 2011-139301 A | 7/2011 |
| JP | 2011-257374 A | 12/2011 |

\* cited by examiner

*Primary Examiner* — Michael Sun
(74) *Attorney, Agent, or Firm* — Kubotera & Associates, LLC

(57) ABSTRACT

A semiconductor device includes a moving state determining unit for obtaining first sensor data from a first sensor for detecting a moving state of a user who possesses an electrical terminal so that the moving state determining unit performs a determination process of the moving state of the electrical terminal; a reliability information determining unit for determining reliability information indicating reliability of a determination result of the determination process; and a transmission processing unit for transmitting the determination result and the reliability information to a main control unit that controls the electrical terminal.

13 Claims, 4 Drawing Sheets

SEMICONDUCTOR DEVICE AND ELECTRICAL TERMINAL

BACKGROUND OF THE INVENTION AND RELATED ART STATEMENT

The present invention relates to a semiconductor device capable of determining a moving state of a user who possesses an electrical terminal according to an input signal from, for example, an acceleration sensor.

In a conventional technique, an acceleration sensor is used for determining a moving state of a user. More specifically, the acceleration sensor is attached to the user, so that data can be retrieved from the acceleration sensor. According to the data, a variation in acceleration that is characteristic to a specific moving state is detected, so that the moving state of the user is determined (refer to Patent Reference).

Patent Reference: Japanese Patent Publication No. 2011-30643

In recent years, in a conventional electrical terminal such as a smart phone, in order to reduce power consumption of a data processing processor, it has been required to change the data processing processor to a terminated state (a suspended state) when the data processing processor is not conducting a data processing. However, in order to determine the moving state of the user regularly, it is necessary to continue to retrieve information from the acceleration sensor all the time. In this case, it is difficult to put the data processing processor in the suspended state, thereby making it difficult to reduce the power consumption of the data processing processor.

To this end, in addition to the data processing processor to be used for performing a normal processing of the conventional electrical terminal, a sub-processor (a micro-controller) with low power consumption is provided as another processor for retrieving the information from the acceleration sensor. Accordingly, the sub-processor is configured to control the acceleration sensor, thereby making it possible to reduce the power consumption of the conventional electrical terminal.

In the conventional electrical terminal, however, when the sub-processor with the low power consumption is provided, data processing performance thereof tends to be lowered. Accordingly, when the moving state of the user is determined, it is difficult to process an amount of data similar to that of the data processing processor. As a result, it is necessary to determine the moving state of the user using a limited amount of data within a limited period of processing time. Further, it is difficult to improve determination accuracy through using a sensor with large power consumption or a plurality of sensors.

In view of the problems of the conventional technique described above, an object of the present invention is to provide a semiconductor device capable of solving the problems of the conventional semiconductor device. In the present invention, it is possible to accurately determine the moving state of the user even when the semiconductor device is provided with a main processor for performing a normal data processing to realize a function of an electrical terminal and a sub-processor with lower power consumption that that of the main processor for controlling a sensor.

Further objects and advantages of the invention will be apparent from the following description of the invention.

SUMMARY OF THE INVENTION

In order to attain the objects described above, according to an aspect of the present invention, a semiconductor device includes a moving state determining unit for obtaining sensor data from a sensor for detecting a moving state of a user who possesses an electrical terminal so that the moving state determining unit performs a determination process of the moving state of the electrical terminal; a reliability information determining unit for determining reliability information indicating reliability of a determination result of the determination process; and a transmission processing unit for transmitting the determination result and the reliability information to a main control unit that controls the electrical terminal.

According to the aspect of the present invention, it is possible to accurately determine the moving state of the user even when the semiconductor device is provided with a main processor for performing a normal data processing to realize a function of the electrical terminal and a sub-processor with lower power consumption that that of the main processor for controlling a sensor.

DETAILED DESCRIPTION OF PREFERRED EMBODIMENTS

Hereunder, preferred embodiments of the present invention will be explained with reference to the accompanying drawings.

Figure 1:
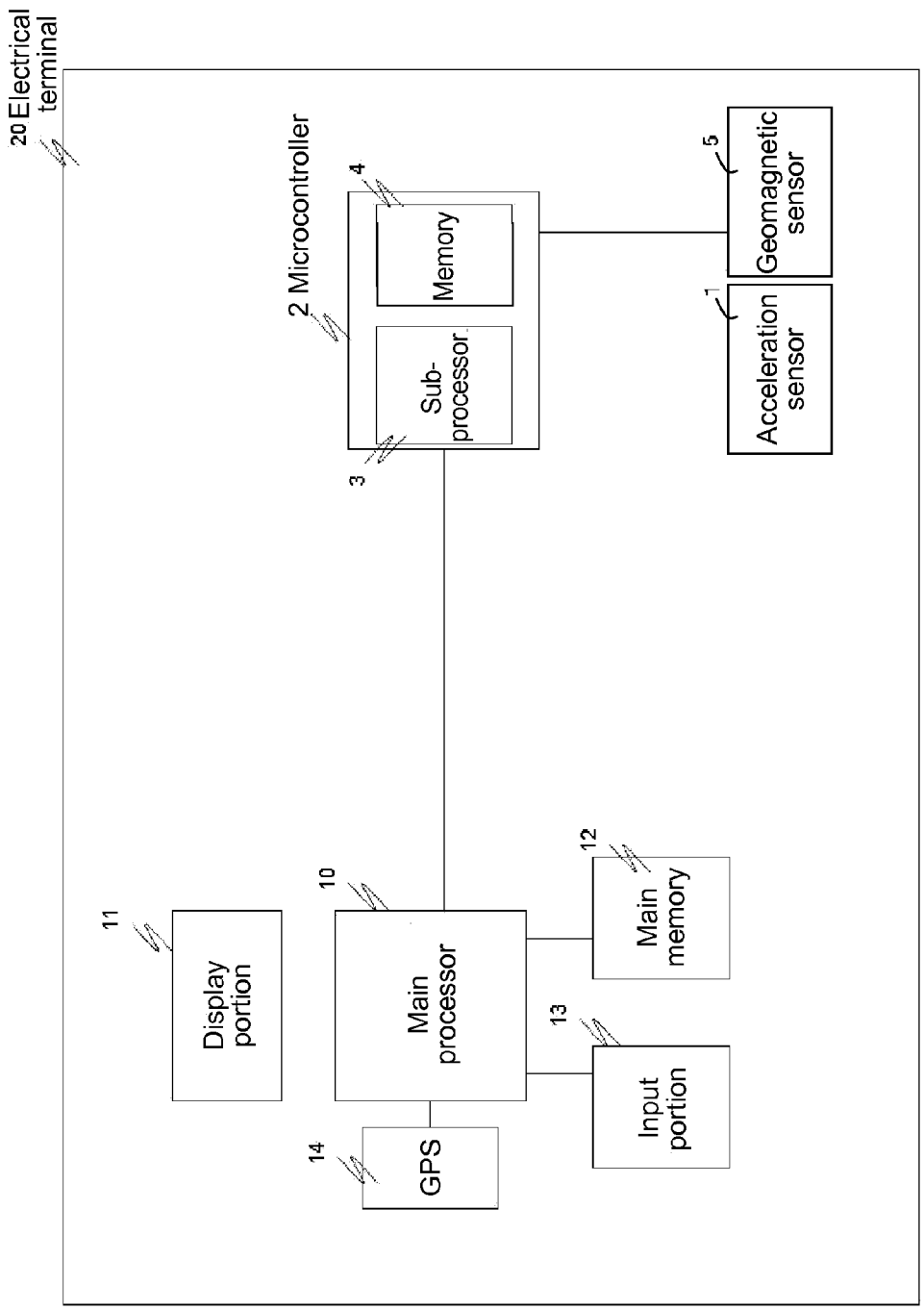
FIG. 1 is a block diagram showing a configuration of an electrical terminal according to an embodiment of the present invention.

FIG. 1 is a block diagram showing a configuration of an electrical terminal 20 according to an embodiment of the present invention. The electric terminal 20 is, for example, a smart phone.

As shown in FIG. 1, the electrical terminal 20 includes an acceleration sensor 1 for detecting acceleration applied to the electrical terminal 20 when a user walks or rides on a vehicles and the like. The acceleration sensor 1 may include, for example, a three-axial acceleration sensor. In addition to the acceleration sensor 1, the electrical terminal 20 may include a geomagnetic sensor 5. When the electrical terminal 20 is provided with the geomagnetic sensor 5, the geomagnetic sensor 5 may be turned off in a normal operation, and is configured to be turned on only when the geomagnetic sensor 5 is used, thereby reducing power consumption.

In the embodiment, the electrical terminal 20 further includes a microcontroller 2 formed of a sub-processor 3 and a memory 4. In addition to the sub-processor 3 and the memory 4, the microcontroller 2 may be configured to have another function such as a voice generation function as necessary.

In the embodiment, the sub-processor 3 is configured to perform a determination process of a moving state of the user who possesses the electrical terminal 20, i.e., the smart phone, using an output signal or sensor data from the acceleration sensor 1. The memory 4 is configured to store a determination result of the sub-processor 3, reliability information relative to the determination result, and the sensor data obtained from the acceleration sensor 1. The memory 4 may be configured to store a final determination result or determination results of several previous operations. The memory 4 may be formed of a volatile memory, or formed of a non-volatile memory when it is necessary to hold the data upon turning off the electrical terminal 20. Further, the sub-processor 3 may be configured to perform the determination process of the moving state of the user using geomagnetic data from the geomagnetic sensor 5 in addition to acceleration data from the acceleration sensor 1 when the reliability information meets a specific condition.

In the embodiment, the electrical terminal 20 further includes a main processor 10 for performing various functions realized in the electrical terminal 20 such as an electric mail transmission function, a schedule administration function, a music playback function, and the like. Further, the main processor 10 is configured to instruct the microcontroller 2 to transmit the moving state determination result data. Further, the main processor 10 is configured to control a display portion 11 to display various contents using the data received from the microcontroller 2.

In the embodiment, the display portion 11 is formed of, for example, a liquid crystal display. The display portion 11 is configured to display various contents including a content of a main text of an electric mail, the determination result of the moving state transmitted from the microcontroller 2, and the like.

In the embodiment, the electrical terminal 20 further includes a main memory 12, an input portion 13, and a GPS (Global Positioning System) 14. The main memory 12 is configured to store various data to be used by the main processor 10. The input portion 13 is configured to receive a data input from the user. The input portion 13 is formed of, for example, a touch panel, a microphone, a keyboard, and the like. The GPS 14 is configured to obtain positional information of the user.

Figure 2:
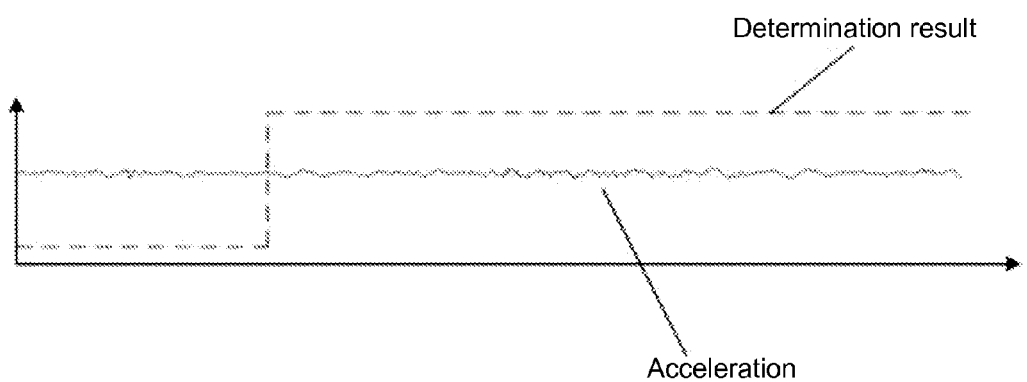
FIG. 2 is a graph showing acceleration data of the semiconductor device in a moving state determining process according to the embodiment of the present invention.
Figure 3:
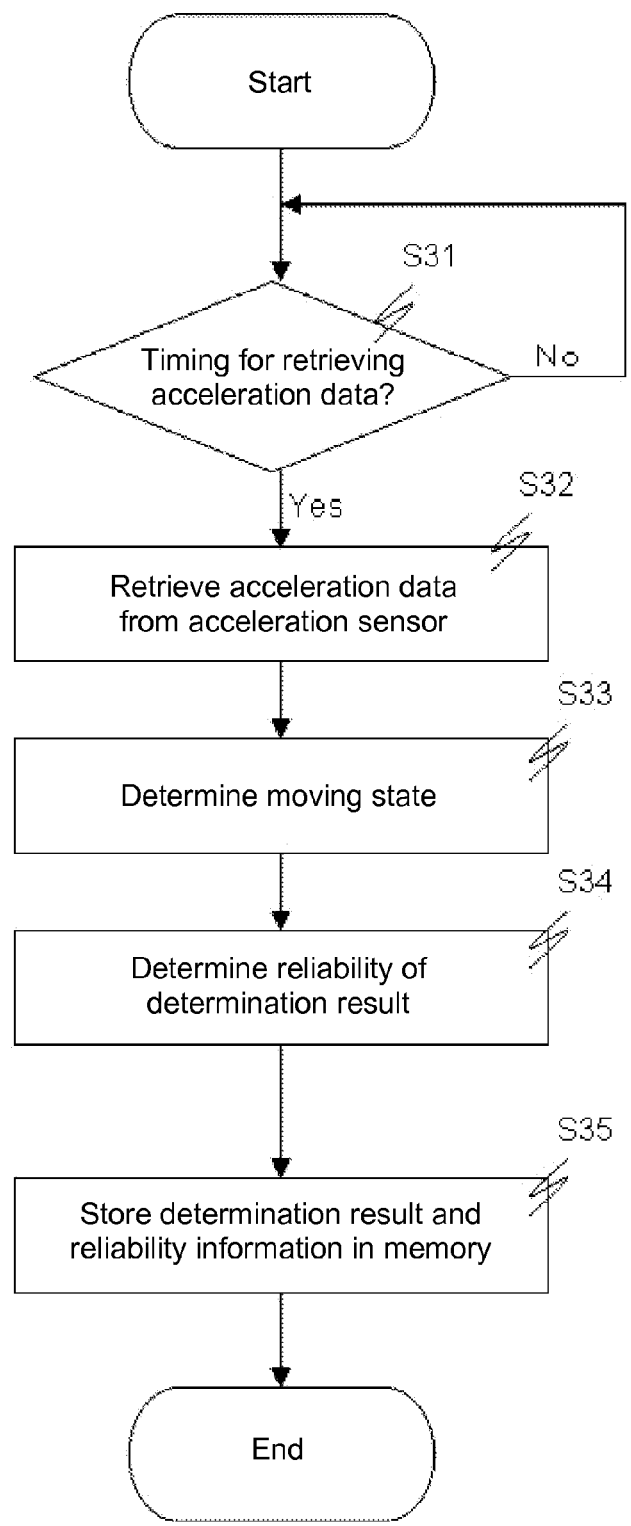
FIG. 3 is a flow chart showing the operation of the semiconductor device in the moving state determining process according to the embodiment of the present invention.

An operation of the sub-processor 3 in the microcontroller 2 in the moving state determining process will be explained next with reference to FIGS. 2 and 3. FIG. 2 is a graph showing the acceleration data of the semiconductor device in the moving state determining process according to the embodiment of the present invention. FIG. 3 is a flow chart showing the operation of the sub-processor 3 in the moving state determining process according to the embodiment of the present invention.

As shown in FIG. 3, in step S31, the sub-processor 3 determines whether it is a timing for retrieving the acceleration data from the acceleration sensor 1. In step S32, when the sub-processor 3 determines that it is the timing for retrieving the acceleration data from the acceleration sensor 1, the sub-processor 3 retrieves the acceleration data shown in FIG. 2 from the acceleration sensor 1, and stores the acceleration data in the memory 4 in the microcontroller 2. When the sub-processor 3 determines that it is not the timing for retrieving the acceleration data from the acceleration sensor 1, the sub-processor 3 waits until it is the timing for retrieving the acceleration data. It may be configured such that the timing for retrieving the acceleration data occurs at a specific constant interval.

In step S33, the sub-processor 3 determines the moving state of the user from a variance in the acceleration data within a specific region of the acceleration data thus retrieved. For example, the sub-processor 3 may be configured to track a variance in the acceleration data from a start point of the acceleration data thus retrieved. When the acceleration data exceeds a threshold value, the sub-processor 3 determines the moving state. Further, the sub-processor 3 may be configured to determine the moving state including a stationary state, a walking state, or a moving state in a vehicle (a bicycle, an automobile, a train). Further, the sub-processor 3 may be configured to determine the type of vehicle.

As shown FIG. 2, the acceleration data shows specific variations. In FIG. 2, a broken line represents a determination result. When the broken line is situated at a lower level (a left side in FIG. 2), the sub-processor 3 is retrieving the acceleration data in step S32 as explained above. When the broken line is changed to a high level (a right side in FIG. 2), the sub-processor 3 determines the moving state in step S33 as explained above.

In step S34, the sub-processor 3 determines the reliability of the determination result. It is noted that the reliability may include a plurality of values such as a value representing the reliability of 80% or greater, a value representing the reliability greater than 60% and less than 80%, and a value representing the reliability less than 60%. For example, the reliability includes the three values, and may include two values or more than four values.

In the embodiment, in determining the reliability of the determination result, the sub-processor 3 may be configured to determine the reliability to be a low level when a period of time consumed for determining the moving state exceeds a threshold value (a period of time for the acceleration data to exceed the threshold value), so that the sub-processor 3 sets the liability to a low level. In contrast, the sub-processor 3 may be configured to determine the reliability to be a high level when the period of time consumed for determining the moving state is short.

In addition to the configuration described above, the sub-processor 3 may be configured to determine the reliability to be the low level when a transitional state of the determination result is not stable (for example, from a bicycle to an automobile to a bicycle). In contrast, the sub-processor 3 may be configured to determine the reliability to be the high level when the determination result continues to be the same. Further, the configurations for determining the reliability may be combined. The threshold value may be a specific constant value, or may be a period of time consumed for a previous determination. In this case, the sub-processor 3 determines whether a period of time consumed for a current determination is longer or shorter than a period of time consumed for a previous determination.

In step S35, the sub-processor 3 correlates the determination result and the reliability information indicating the reliability of the determination result to the acceleration data stored in step S32, and stores the determination result and the reliability information thus correlated to the acceleration data in the memory 4, thereby completing the moving state determination process.

In the embodiment, it may be configured such that the geomagnetic sensor 5 is utilized in addition to the acceleration sensor 1 when the reliability continues to be the low level for a specific period of time. In this case, the geomagnetic data obtained from the geomagnetic sensor 5 is processed in an operation similar to that of the acceleration data as described above.

Figure 4:
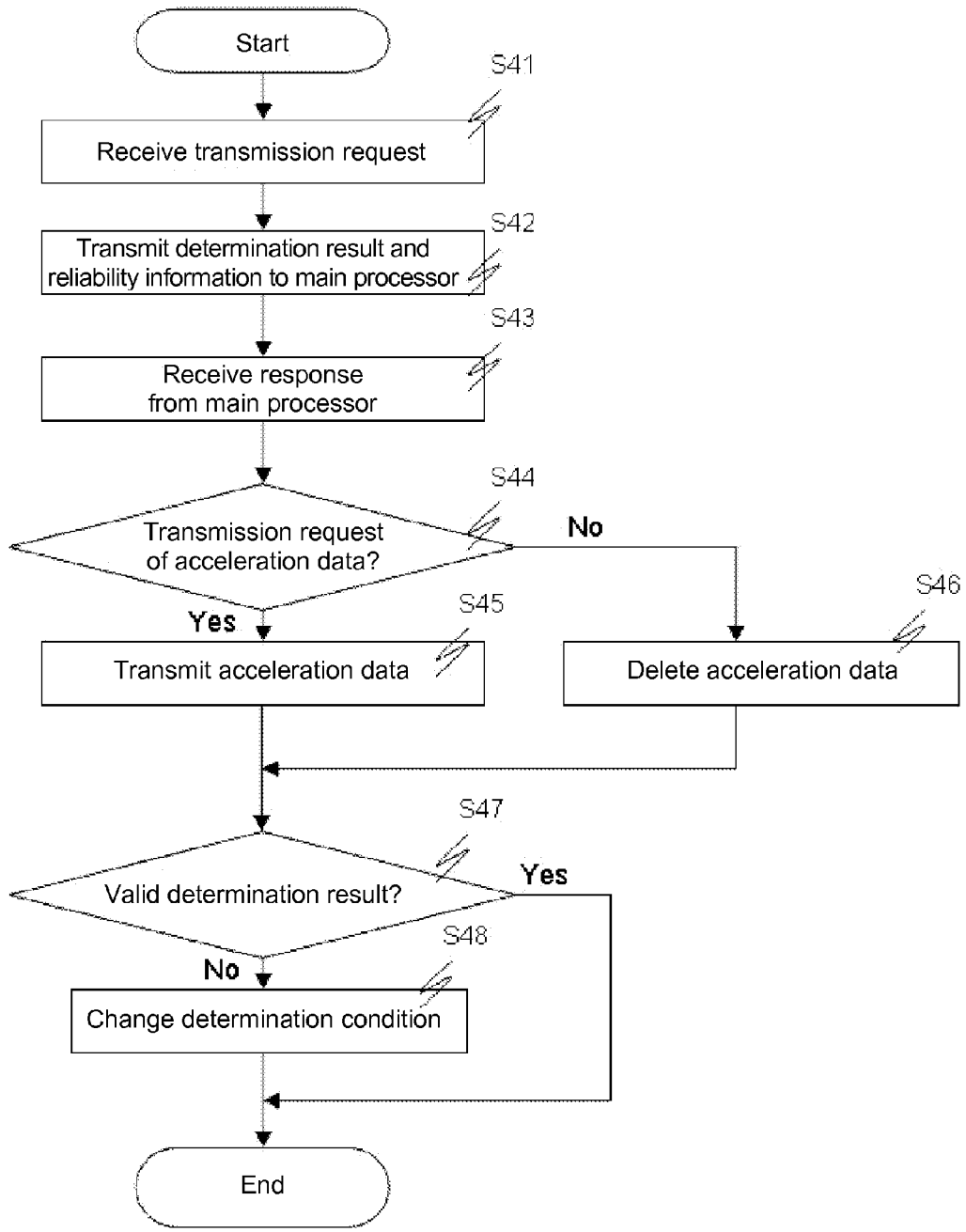
FIG. 4 is a flow chart showing a communication operation of a microcontroller of the semiconductor device in a transmission process according to the embodiment of the present invention.

A communication operation of the sub-processor 3 in the microcontroller 2 in the transmission process when the microcontroller 2 receives the transmission request of the determination result of the moving state from the main processor 10 will be explained next with reference to FIG. 4. FIG. 4 is a flow chart showing the communication operation of the microcontroller 2 of the semiconductor device 20 in the transmission process according to the embodiment of the present invention.

In step S41, the sub-processor 3 detects that the sub-processor 3 receives the transmission request from the main processor 10. In step S42, the sub-processor 3 transmits the determination result and the reliability information representing the reliability of the determination result stored in the memory 4 in the microcontroller 2 to the main processor 10.

In step S43, the sub-processor 3 receives a response relative to the transmission request from the main processor 10. In step S44, the sub-processor 3 determines whether the response contains the transmission request of the acceleration data obtained from the acceleration sensor 1.

In step S45, when the sub-processor 3 determines that the response contains the transmission request of the acceleration data (Yes in step S44), the sub-processor 3 retrieves the acceleration data from the memory 4, and transmits the acceleration data to the main processor 10. In step S46, when the sub-processor 3 determines that the response does not contain the transmission request of the acceleration data (No in step S44), the sub-processor 3 determines that the acceleration data can be deleted, and deletes the acceleration data.

In the embodiment, it is configured such that the acceleration data is deleted through the process described above when the sub-processor 3 determines that the response does not contain the transmission request of the acceleration data. Alternatively, it may be configured such that the acceleration data is deleted after a specific period of time is elapsed or a remaining capacity of the memory 4 becomes lower than a specific level (for example, 80%).

In step S47, the main processor 10 determines whether the determination result is valid. In step S48, when the main processor 10 determines that the determination result is not valid, the sub-processor 3 changes the determination condition. For example, the sub-processor 3 determines to use the geomagnetic sensor 5 in addition to the acceleration sensor 1, or instead of the acceleration sensor 1. In this case, the geomagnetic sensor 5 is configured to stop operating in a normal operation, and to start operating only when it is attempted to improve the reliability. Accordingly, it is possible to improve the reliability of the determination result while reducing the power consumption.

Alternatively, when the sub-processor 3 changes the determination condition, it may be configured such that the threshold value used for the determination is changed so that the determination result matches to the determination result obtained by the main processor 10 and transmitted from the main processor 10. When the microcontroller 2 receives such feedback from the main processor 10 relative to the validity of the determination result, the microcontroller 2 is capable of dynamically adjusting the determination process of the moving state, thereby making it possible to improve the reliability of the determination result.

Further, in addition to the process of receiving the transmission request from the main processor 10, the sub-processor 3 may be configured to determine whether the reliability or the determination type is changed. In this case, only when the sub-processor 3 determines that the reliability or the determination type is changed, the sub-processor 3 notifies the main processor 10 through interruption and the like. With the configuration described above, it is possible to operate the main processor 10 only when it is necessary, thereby making it possible to further reduce the power consumption.

An operation of the main processor 10 in the process relative to the determination result according to the reliability information when the main processor 10 receives the determination result and the reliability information from the sub-processor 3 will be explained next.

For example, when the reliability is greater than 80%, the main processor 10 responds to the sub-processor 3 that the acceleration data does not need to be transmitted. Further, the main processor 10 controls the display portion 11 to display the determination result received from the sub-processor 3.

When the reliability is greater than 60% and less than 80%, the main processor 10 responds to the sub-processor 3 that the acceleration data needs to be transmitted, so that the main processor 10 performs the determination process according to the acceleration data thus received. In this case, the main processor 10 possesses processing performance higher than that of the sub-processor 3. Accordingly, the main processor 10 is capable of determining the moving state using the acceleration data of a longer period of time compared to the sub-processor 3, thereby making it possible to improve the reliability of the determination result. Further, it is not necessary to retrieve the acceleration data from the acceleration sensor 1 one more time, thereby making it possible to prevent the power consumption from increasing upon starting the acceleration sensor 1.

When the reliability is less than 60%, the main processor 10 responds to the sub-processor 3 that the acceleration data does not need to be transmitted. In this case, the main processor 10 performs the determination process using other sensor such as a GPS and the like, so that the main processor 10 performs the correction process relative to the determination result of the sub-processor 3. In this case, it may be difficult to accurately determine the moving state only through the acceleration data. Accordingly, it is preferred that the correction process is performed using information from other sensor.

An operation of the main processor 10 in the process of determining the validity of the determination result and returning a feedback of the correction result to the sub-processor 3 will be explained next.

In the embodiment, when it is determined that the reliability is greater than 80%, the main processor 10 performs the process of determining whether the determination result is valid at a specific timing or when the reliability continues to be greater than 80% for a specific number of times. When the main processor 10 performs the process of determining whether the determination result is valid, the main processor 10 may retrieves the acceleration data, or may use other sensor. When the main processor 10 determines that the determination result is valid, the main processor 10 notifies the sub-processor 3 that the determination result is valid. When the main processor 10 determines that the determination result is not valid, the main processor 10 notifies the sub-processor 3 that the determination result is not valid.

In the embodiment, when it is determined that the reliability is greater than 60% and less than 80%, the main processor 10 performs the process of determining whether the determination result is valid using the acceleration data received from the microcontroller 2. When the determination result of the main processor 10 matches the determination result transmitted from the sub-processor 3, the main processor 10 determines that the determination result is valid, and the main processor 10 notifies the sub-processor 3 that the determination result is valid. When the determination result of the main processor 10 does not match the determination result transmitted from the sub-processor 3, the main processor 10 determines that the determination result is not valid, and the main processor 10 notifies the sub-processor 3 that the determination result is not valid.

In the embodiment, when it is determined that the reliability is less than 60%, the main processor 10 performs the process of determining whether the determination result is valid using other sensor. When the determination result of the main processor 10 matches the determination result transmitted from the sub-processor 3, the main processor 10 determines that the determination result is valid, and the main processor 10 notifies the sub-processor 3 that the determination result is valid. When the determination result of the main processor 10 does not match the determination result transmitted from the sub-processor 3, the main processor 10 determines that the determination result is not valid, and the main processor 10 notifies the sub-processor 3 that the determination result is not valid.

As described above, in the embodiment, the main processor 10 is configured to perform the process of determining whether the determination result is valid, and to notify the sub-processor 3 of the determination result. Accordingly, it is possible to improve accuracy of the determination process of the sub-processor 3 afterward.

As described with reference to FIGS. 1 to 4, in the embodiment, the sub-processor 3 with the power consumption lower than that of the main processor 10 is configured to determine the moving state of the user who possesses the electrical terminal in the first determination process. When it is determined that the reliability of the determination result is sufficiently high, the correction process of the main processor 10 is omitted, thereby making it possible to reduce the power consumption of the electrical terminal.

Further, in the embodiment, when it is determined that the reliability of the determination result notified from the sub-processor 3 is not sufficiently high, the main processor 10 performs the correction process, thereby making it possible to improve the reliability of the determination result. Further, the main processor 10 is configured to send the correction result to the sub-processor 3, so that it is possible to adjust the determination condition of the sub-processor 3. Accordingly, it is possible to dynamically improve the determination accuracy of the sub-processor 3. As a result, it is possible to lessen the correction process of the main processor 10, thereby making it possible to further reduce the power consumption.

It is noted that the present invention is not limited to the embodiment described with reference to FIGS. 1 to 4, and may be modified within the scope of the invention. For example, in the embodiment, the acceleration sensor 1, the geomagnetic sensor 5, and the GPS 14 are disposed, and sensors are not limited thereto.

The disclosure of Japanese Patent Application No. 2012-089352, filed on Apr. 10, 2012, is incorporated in the application by reference.

While the invention has been explained with reference to the specific embodiments of the invention, the explanation is illustrative and the invention is limited only by the appended claims.

What is claimed is:
1. A semiconductor device, comprising:
   a moving state determining unit for obtaining first sensor data from a first acceleration sensor so that the moving state determining unit monitors a transitional state of the first sensor data, and determines whether a user who possesses an electrical terminal is walking or moving by a vehicle when the transitional state of the first sensor data exceeds a specific threshold value;
   a reliability information determining unit for determining reliability information indicating reliability of a determination result of the moving state determining unit; and
   a transmission processing unit for transmitting the determination result and the reliability information to a main control unit that controls the electrical terminal,
   wherein said reliability information determining unit is configured to determine that the reliability information is set to a first value when the moving state determining unit performs the determination process for a period of time longer than a specific level, and
   said reliability information determining unit is configured to determine that the reliability information is set to a second value indicating that the reliability is higher than that of the first value when the moving state determining unit performs the determination process for a period of time shorter than the specific level.

2. The semiconductor device according to claim 1, further comprising a storage unit for storing the first sensor data; and a data control unit for transmitting the first sensor data to the main control unit when the main control unit transmits a response to request transmission of the first sensor data, said data control unit being configured to allow the first sensor data to be deleted when the main control unit transmits a response to not request the transmission of the first sensor data.

3. The semiconductor device according to claim 1, further comprising a reception unit for receiving a validation result of the main control unit relative to the determination result; and a change control unit for changing an execution condition of the determination process when the validation result indicates that the determination result is not valid.

4. The semiconductor device according to claim 1, wherein said moving state determining unit is configured to obtain second sensor data from a second sensor so that the moving state determining unit performs the determination process using the second sensor data when the validation result indicates that the determination result is not valid.

5. The semiconductor device according to claim 1, wherein said moving state determining unit is configured to determine whether the user is walking or moving by the vehicle that is a bicycle, an automobile, or a train.

6. The semiconductor device according to claim 1, wherein said moving state determining unit is configured to determine the user is walking or moving by the vehicle according to a variance in the first sensor data.

7. The semiconductor device according to claim 4, wherein said second sensor is a geomagnetic sensor.

8. The semiconductor device according to claim 4, wherein said reliability information determining unit is configured to determine the reliability information according to both the first sensor data and the second sensor data.

9. The semiconductor device according to claim 1, wherein said reliability information determining unit is configured to determine that the reliability information is set to the second value when the moving state determining unit obtains a same determination result consecutively.

10. The semiconductor device according to claim 1, wherein said reliability information determining unit is configured to categorize the reliability information into a plurality of levels according to the reliability of the determination result; and
   said transmission processing unit is configured to transmit one of the levels together with the determination result to the main control unit.

11. The semiconductor device according to claim 1, wherein said reliability information determining unit is configured to categorize the reliability information into a first level, a second level, and a third level according to the reliability of the determination result;
   said transmission processing unit is configured to not transmit the determination result to the main control unit when the reliability information determining unit categorizes the reliability information to the first level or the third level, and said transmission processing unit is configured to transmit the second level together with the determination result to the main control unit when the reliability information determining unit categorizes the reliability information to the second level.

12. An electrical terminal comprising:

an acceleration sensor for detecting a user who possesses an electrical terminal;

a semiconductor device for controlling the acceleration sensor; and a main control unit for controlling the electrical terminal, wherein said semiconductor device comprises:

a moving state determining unit for obtaining first sensor data from a first acceleration sensor so that the moving state determining unit monitors a transitional state of the first sensor data, and determines whether a user who possesses an electrical terminal is walking or moving by a vehicle when the transitional state of the first sensor data exceeds a specific threshold value;

a reliability information determining unit for determining reliability information indicating reliability of a determination result of the determination process;

a transmission processing unit for transmitting the determination result and the reliability information to the main control unit that controls the electrical terminal; and a storage unit for storing the sensor data, and said main control unit comprises:

a reception unit for receiving the determination result and the reliability information;

a validation processing unit for performing a validation process relative to the determination result when the reliability information meets a specific condition; and a display processing unit for displaying a validation result of the validation processing unit, wherein said validation processing unit is configured to request the semiconductor device to transmit the sensor data when the reliability information meets a first condition so that the validation processing unit performs the validation process relative to the determination result using the sensor data, and said validation processing unit is configured to perform the validation process relative to the determination result using data obtained from the main control unit when the reliability information meets a second condition.

13. The electrical terminal according to claim 12, wherein said main control unit further includes a validation result notification unit for notifying the validation result to the semiconductor device when the validation processing unit performs the validation process.

* * * * *